United States Patent [19]

Miller

[11] Patent Number: 4,636,121
[45] Date of Patent: Jan. 13, 1987

[54] HOLDING SCREW

[76] Inventor: Lillias S. Miller, 738 Yates, Romeoville, Ill. 60441

[21] Appl. No.: 725,619

[22] Filed: Apr. 22, 1985

[51] Int. Cl.4 ....................... F16B 13/04; F16B 39/02
[52] U.S. Cl. ..................... 411/21; 411/140; 411/216; 411/253; 411/255; 411/292; 411/322; 411/342; 411/422
[58] Field of Search ........................ 411/21, 22, 23, 32, 411/33, 54, 140, 172, 180, 214, 215, 216, 253, 254, 255, 256, 292, 321, 322, 323, 340, 341, 342, 343, 344, 345, 347, 395, 422

[56] References Cited

U.S. PATENT DOCUMENTS

| | | | |
|---|---|---|---|
| 791,373 | 5/1905 | Shaffer | 411/922 |
| 1,162,266 | 11/1915 | Weiss | 411/342 |
| 2,396,276 | 3/1946 | Lang | 411/470 |
| 2,408,560 | 10/1946 | Keehn | 411/344 |
| 3,534,650 | 10/1970 | Kubokawa | 411/344 |

FOREIGN PATENT DOCUMENTS

| | | | |
|---|---|---|---|
| 747838 | 10/1944 | Fed. Rep. of Germany | 411/323 |
| 2148317 | 4/1973 | Fed. Rep. of Germany | 411/32 |
| 2341708 | 3/1974 | Fed. Rep. of Germany | 411/342 |
| 2845000 | 4/1980 | Fed. Rep. of Germany | 411/21 |
| 949733 | 2/1949 | France | 411/358 |
| 1309948 | 10/1962 | France | 411/321 |
| 6913885 | 3/1971 | Netherlands | 411/54 |
| 14468 | of 1905 | United Kingdom | 411/292 |
| 485087 | 5/1938 | United Kingdom | 411/341 |
| 456096 | 2/1975 | U.S.S.R. | 411/21 |

*Primary Examiner*—Thomas J. Holko
*Attorney, Agent, or Firm*—Ernest Kettelson

[57] ABSTRACT

A holding screw rotatable in an inward direction having means to prevent or retard rotational movement in the opposite direction. The screw device includes a conventional screw body having external helical threads to move the screw inwardly by rotating in one direction, a central cylindrical cavity in the screw body opening to the screw head, angled ports extending through the side wall of the screw body opening to the central cavity, an elongated longitudinally movable retaining member in the central cavity having spring biased arms positioned along its shank normally biased outwardly therefrom diagonally at an acute angle facing toward the screw head but resiliently foldable against the shank of the elongated member when it is pushed into the cylindrical central cavity, the free ends of the spring biased arms being in registration with respective ones of said angled ports, a coiled spring in the bottom closed end of the cylindrical central cavity which is compressed when the elongated retaining member is fully seated in the cylindrical cavity, and a short set screw threaded into the open end of the cylindrical cavity to hold the retaining member fully seated therein. In use, the holding screw is screwed in place in a piece of wood or other appropriate material, the set screw removed from the open end of the cylindrical cavity allowing the compressed coil spring to urge the elongated retaining member toward the open end whereupon the free ends of the spring biased arms enter the angled ports and move therethrough to extend outwardly from the side wall of the screw as the elongated retaining member is urged outwardly, thereby engaging the material in which the screw is seated to resist rotation thereof in the direction of becoming loosened or unseated.

1 Claim, 9 Drawing Figures

HOLDING SCREW

BACKGROUND OF THE INVENTION

This invention relates to the field of screws having holding or retaining means incorporated therein.

One of the major problems with conventional screws is that they tend to become loose and in some cases fall completely out of the work piece in which they had been seated.

The inventor of the invention described herein has had a search made to determine the state of the prior art. The only patents found by those who conducted the search are design U.S. Pat Des. Nos. 103,304 and 223,560 neither of which show any holding or retaining means incorporated therein to resist loosening or unintentional removal of the screw, and utility U.S. Pat. Nos. 937,577; 2,195,685; 2,936,667; 3,386,138; 3,461,769; and 4,253,509. No. 937,577 is actually an extension bolt and it includes holding means only in the sense that a threaded cap or nut member is received on the threaded shank of the bolt. U.S. Pat. No. 2,195,685 discloses a telescoping stud which compresses against a coil spring and to that extent the coil spring provides some resistance to loosening. U.S. Pat. No. 2,936,667 discloses a T-slot bolt having a pair of set screws reachable from the inner facing surface of the bolt head to tighten against a surface of the T-slot to keep the bolt from sliding back and forth in the slot. U.S. Pat. No. 3,386,138 discloses a release type of bolt which separates from its retaining nut under pressure. The only holding means is actually the nut. U.S. Pat. No. 3,461,769 discloses an adjustable length screw, in which the only retaining or holding means is the threaded tap 18a itself and to some extent the separate biasing spring 19. U.S. Pat. No. 4,253,509 discloses a theft deterrent locking nut, in which the threaded shanks and threaded bores constitute the holding or retention means. None of the patents found by those who did the search for this inventor disclose any built-in holding or retention means incorporated into the screw body itself to resist loosening or unintentional removal of a threaded screw in an application where a separate threaded nut or threaded tap of some kind cannot be used, nor a separate compression spring to provide a constant bias against the inner face of the screw head.

The invention disclosed herein solves the problem of screws loosening and falling out unintentionally by providing a built-in retention member comprising a stem seated in a central cavity of the screw body having diagonally extending projections which can extend through the side wall of the screw body to bite into the material of the work piece in which the screw is seated and which can be withdrawn into the interior of the screw body when it is desired to remove the screw, by moving the stem of the retention member axially inwardly and outwardly of the screw body.

SUMMARY OF THE INVENTION

It is an object of the invention to provide a self contained holding screw which resists loosening and unintential removal.

It is an object of the invention to provide a self contained holding screw which provides gripping projections that can be extended outwardly from the side wall of the screw body and withdrawn inwardly thereof by an operating mechanism built-in as part of the screw assembly.

DESCRIPTION OF PREFERRED EMBODIMENT

Figure 2:
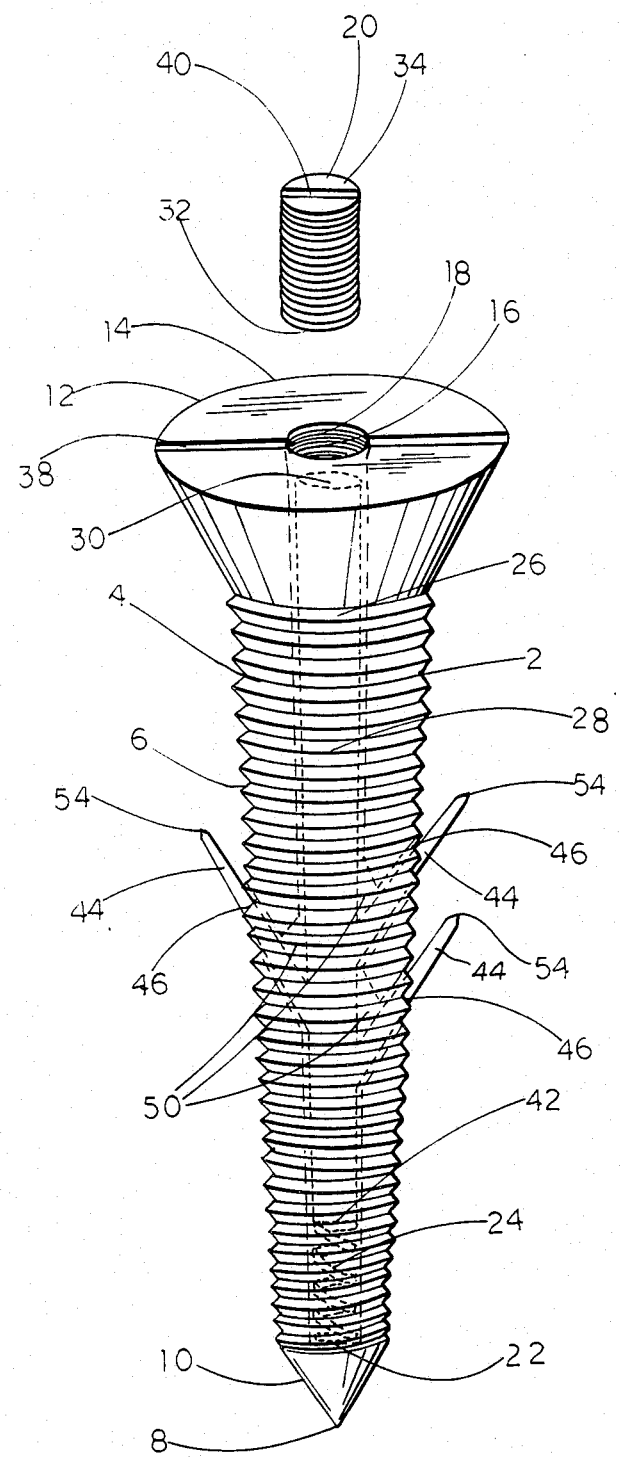
FIG. 2 is a slightly perspective view shown in FIG. 1 with its retaining member shown in its retaining position, internal parts of the retaining member being shown in phantom.

A self holding screw 2 comprises an elongated screw body 4, including an elongated threaded shank 6, tapered to a sharp point 8 at the leading end 10, and terminating in a screw head 12 at the trailing end or driving end 14.

A cylindrical central bore or cavity 16 opens to the driving end 14 of the screw body 4 at an aperture 18 in the center of the screw head 12. The upper portion of the cylindrical cavity 16 is internally threaded for a relatively short distance from the aperture 18 inwardly to receive a set screw 20 therein to close the open end or aperture 18. The cylindrical cavity 16 extends through the elongated screw body 4 almost its entire length and terminates at a closed bottom cavity wall 22.

Figure 1:
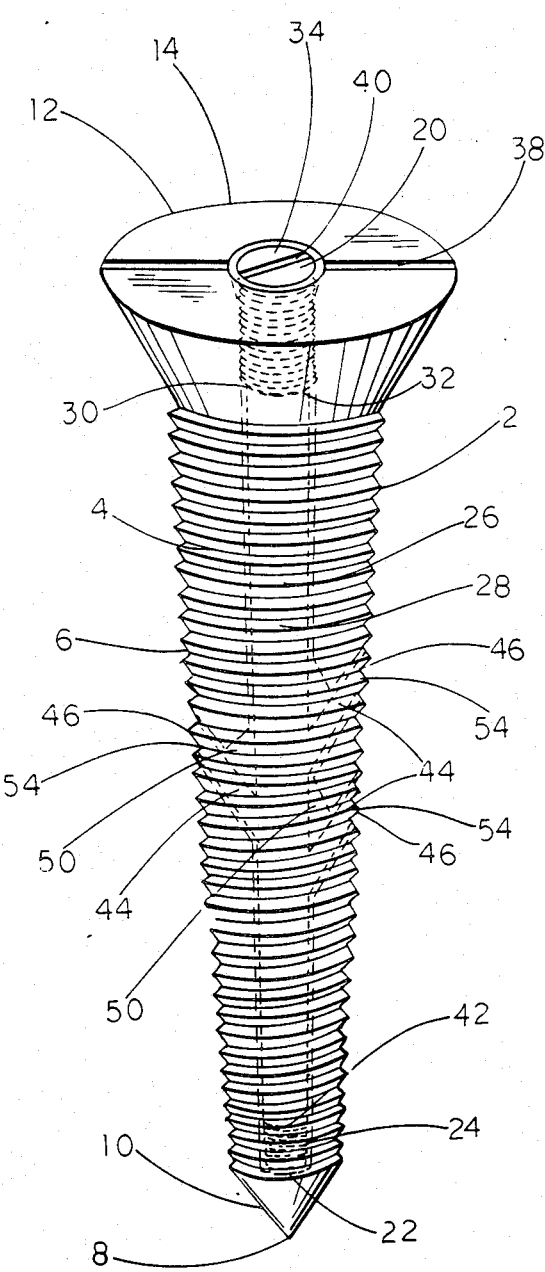
FIG. 1 is a slightly perspective view of a self holding screw in accordance with this invention shown with its retaining member in the non-retaining position, the retaining member shown in phantom by broken lines.
Figure 3:
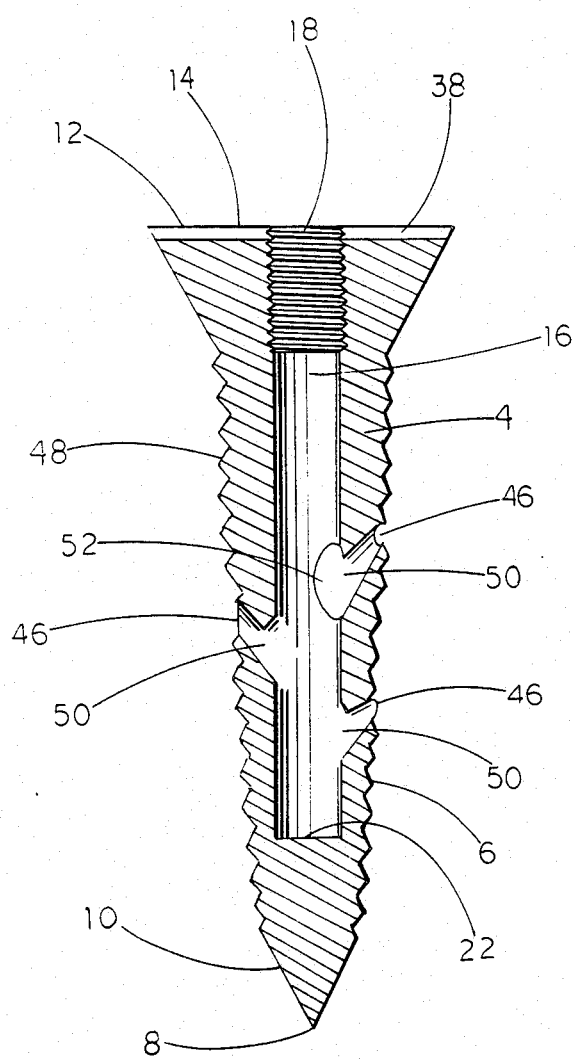
FIG. 3 is a section view of a longitudinal section through the center of a self holding screw in accordance with this invention, with the retaining member removed.
Figure 4:
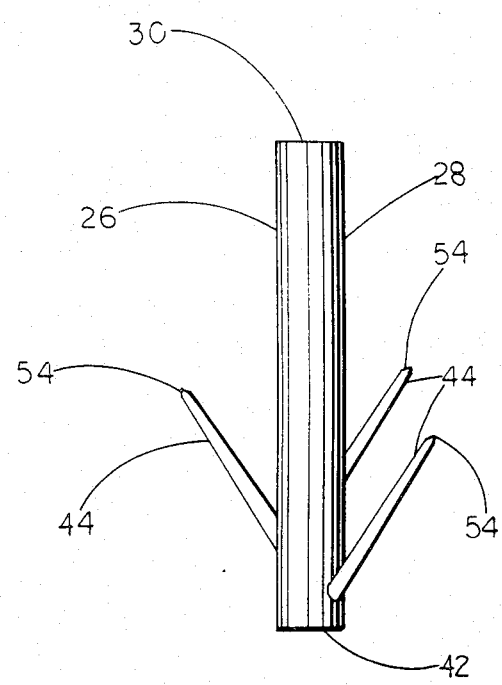
FIG. 4 is a side elevation view of the retaining member in accordance with this invention showing its spring arms in their normally relaxed diagonally extending position.
Figure 5:
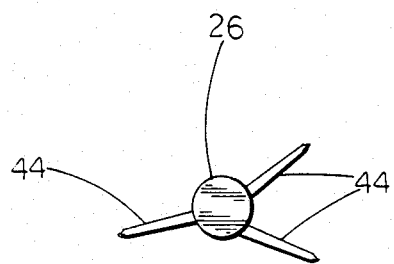
FIG. 5 is a top plan view of the retaining member shown in FIG. 4.
Figure 6:
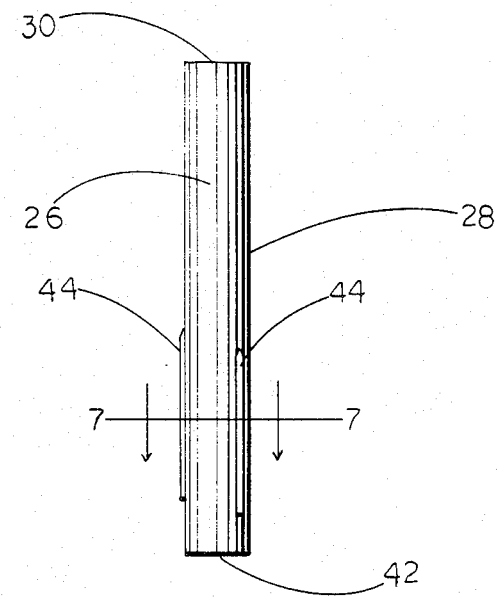
FIG. 6 is a side elevation view of the retaining member showing its spring arms folded under tension against the side wall of the retaining member.
Figure 7:
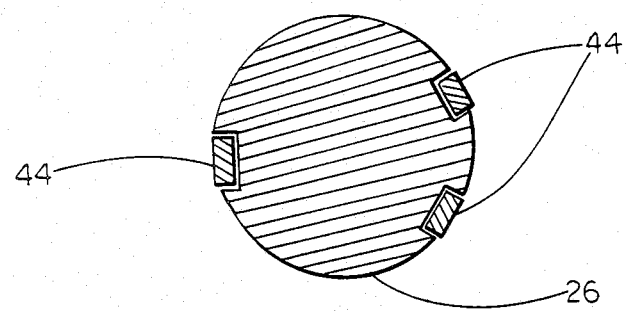
FIG. 7 is a section view taken on line 7—7 of FIG. 6.
Figure 8:
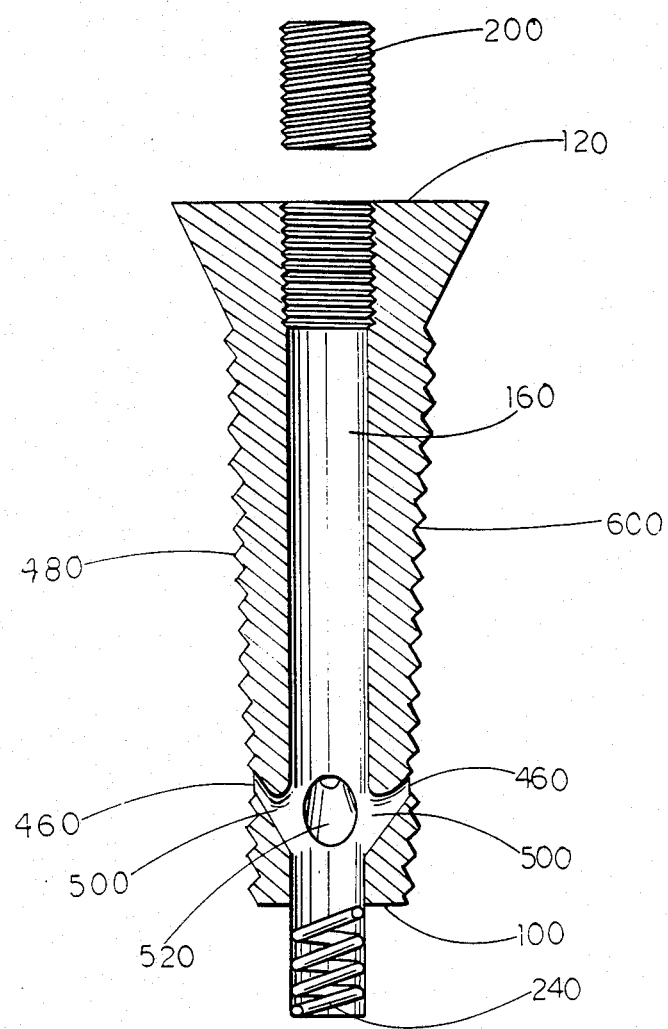
FIG. 8 is a section view of a longitudinal section through a modified embodiment of the invention.
Figure 9:
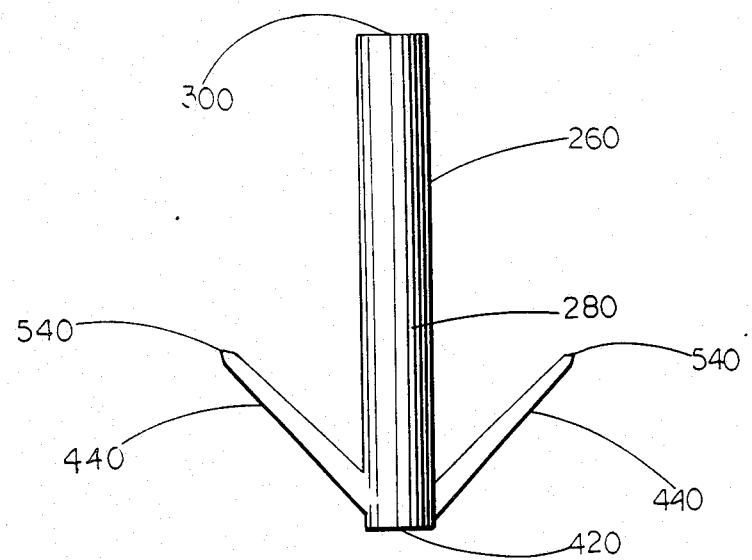
FIG. 9 is a side elevation view of a retaining member for use with the modification shown in FIG. 8.

A coiled compression spring 24 is positioned in the central cavity resting against the bottom cavity wall 22. An elongated retaining member 26 is slidingly positioned in the central cavity 16 for reciprocating movement between a non-retaining position as shown in FIG. 1 and a retaining position as shown in FIG. 2.

The elongated retaining member 26 includes an elongated stem 28 having an upper end 30 which abuts against the inner face 32 of set screw 20 when it has been screwed in place with its outer face 34 at that time substantially flush with the outer face 36 of the main screw head 12 or slightly inset therefrom. The screw head 12 includes a screw driver slot 38 to receive the working tip of a screw driver, and the outer face 34 of the set screw 20 may have a corresponding slot 40 which can be axially aligned with the screw driver slot 38 of the main screw head 12.

It should be understood that the screw head may be of any conventional design and the receiving recesses or projections to accept a screw driving tool may also be of any conventional design and configuration. The holding screw in accordance with this invention may be used with so called Phillips screw drivers, screw drivers having the more conventional straight edge working tips, may even have a hexagonal recess to accept an Allen type wrench as the driving tool.

The elongated stem 28 of the retaining member 26 extends far enough into the cavity 16 from its upper end 30 abutting against the inner face 32 of the set screw 20 when in place for its bottom end 42 to bear against and fully compress the coiled spring 24 against the bottom cavity wall 22. Thus, when the set screw 20 is removed, the coiled spring 24 biases the stem 28 of the retaining member 26 outwardly from its non-retaining position to its retaining position.

The retaining member 26 includes a plurality of flexible elongated spring members or fingers 44 extending diagonally outwardly from the stem 28 at an acute angle facing toward the trailing end or driving end 14 of the screw 2 when said spring fingers 44 are in their normal relaxed or untensioned position. The spring fingers 44 are movable under tension from said relaxed diagonal position to an abutting position alongside the stem 28 in substantially parallel relation therewith. Even one of such spring fingers 44 will provide resistance against rotational movement of the holding screw 2 seated in a piece of wood when the finger 44 is in its diagonally extending position as well as against longitudinal or axial movement thereof in the unseating direction. However, a plurality of spring fingers 44 may be provided to increase such resistance of the holding screw 2 to rotational and axial movement in the unseating direction. The spring fingers 44 are positioned on the stem 28 in axially or longitudinally spaced apart relationship as well as being spaced apart arcuately or circumferentially.

An aperture 46 is provided for each spring finger 44 in the circular side wall 48 of the shank 6 which opens from the outside thereof to the central bore or cavity 16 of the screw body 4. Each aperture 46 has a cross-sectional configuration and dimension corresponding to that of the spring fingers 44 to permit sliding movement of the spring fingers 44 inwardly and outwardly of their respective apertures 46. An open passageway 50 extends through the side wall 48 of the shank 6 from each aperture 46 to the central cavity 16 which is preferably frusto-conical in cross-sectional configuration having a substantially larger diameter opening 52 to the cavity 16 than the diameter aperture 46 which opens to the outside. Such passageways 50 and apertures 46 are positioned in the shank 6 at locations which place the inner larger diameter opening 52 of each passageway 50 in registration with the free end 54 of a respective one of the spring fingers 44 when the retaining member 26 is fully seated in the central cavity 16. In addition to having a frusto-conical shape, the passageways 50 extend diagonally through the side wall 48 of the shank 6, the central axis of each passageway 50 being at substantially the same acute angle relative the central axis of the stem 28 of the retaining member 26 when positioned in the central cavity 16 as the spring fingers 44 when in their diagonally extended relaxed position.

Thus, when the retaining member 26 is fully inserted in the cavity 16, the free ends 54 of the fingers 44 are in position to be received in respective ones of the passageways 50 when the set screw 20 is removed and the bias of the compressed spring 24 urges the stem 28 of retaining member 26 in the direction toward the driving end 14 of the self holding screw 2. As the fingers 44 enter the frusto-conical passageway 50 they are guided to and through the respective apertures 46. The fingers 44 are long enough to extend a sufficient distance beyond the outer side wall 48 of the shank 6 to bite into and grip the wood of the work piece in which the self holding screw 2 is seated, when the stem 28 of the retaining member 26 has been urged by spring 24 to its retaining position. The spring 24 has enough compressive strength that when released it will force the retaining member 26 upwardly toward the retaining position with its plurality of fingers 44 extending through passageways 50 and apertures 46 and into the wood of the work piece in which the screw 2 is seated. When in such position, the self holding screw 2 is restrained from both rotational and axial movement in the unseating direction.

In a modification of this invention, the stem 280 of the retaining member 260 may have spring fingers 440 only at the bottom end region 420 of stem 280 to project through frusto-conical passageways 500 and apertures 460 of the side wall 480 of shank 600 of the modified screw 2 located near the inner or leading end 100 thereof when the retaining member 260 is moved to its retaining position by the force of the compression spring 240. Such apertures 460 are spaced apart from the screw head 120 a distance substantially equal to the thickness of a board or wall through which the modified screw 2 is to fully extend, whereupon when the apertures 460 begin to come entirely through such board or wall, the free ends 540 of the fingers 440 begin to project outwardly from the side wall 480 of shank 600 to bear against that side of the board or wall under the urging of the compression spring 240. In this modification, the fingers 440 are preferably broader in their cross-sectional dimension than in the previously described embodiment and are longer in their longitudinal dimension to extend outwardly farther from the side wall 480 of the shank 600. This provides greater bearing surface against the surface of the board or wall through which the modified screw 2 extends.

If and when it is desired to remove the self holding screw 2 from a work piece in which it has been seated, the set screw 20, or 200 in the modification described above, is threadely engaged with the internally threaded upper portion of the cylindrical cavity 16, or 160 in the modification, and rotated to move the set screw inwardly in bearing engagement against the upper end 30, or 300 in the modification, of the retaining member 26 or 260, thereby moving the retaining member toward the inner or leading end 10 or 100 until it reaches the non-retaining position in which the free ends 54 or 540 of fingers 44 or 440 are drawn in from the side wall 48 or 480 into the passageway 50 or 500 so they no longer project from the side wall of the screw 2. The screw 2 may then be rotated in the unseating direction to remove it from the work piece without damage to the screw. It may thereafter be used over again.

The screw body 4 is preferably of metal having external helical threads with a sharp cutting edge to cut and form corresponding threads in the material in which the screw 2 is seated. The retaining member 26, or 260 of the modification, is preferably made of spring steel whereby the integrally formed fingers 44, and 440 of the modification, hold their normally relaxed diagonal position extending outwardly from the stem 28, and 280 of the modification, until considerable pressure is applied to fold them inwardly under tension to their fully tensioned position in side-by-side abutting relationship with stem 28, and 280 in the case of the modification.

I claim:

1. A self holding screw comprising an elongated threaded screw shank having a conical side wall, a leading end for entry into a work piece and a trailing engagement end for driving engagement with a screw driving tool, an elongated cavity in said screw shank opening to said trailing engagement end and closed at its opposite end, a retaining member positioned in said cavity for reciprocal movement therein toward said leading end and toward said trailing end, said retaining member including a solid elongated body portion, the cross-sectional configuration of said solid elongated body portion corresponding to the cross-sectional configuration of said elongated cavity, a plurality of integrally formed projecting fingers on said retaining member extending diagonally from said retaining member at an acute angle facing toward said trailing end, aperture means through said conical side wall of said screw shank opening to said elongated cavity in registration with said fingers of said retaining member seated in said elongated cavity for reception of said fingers through said aperture means and movement of said fingers relative to said aperture means wherein said fingers project outwardly beyond the said conical side wall of said screw shank in an extended position and wherein said fingers are withdrawn completely within the circumferential surface and boundary of said screw shank in a retracted position, and reciprocating means to move said retaining member and fingers between said extended and retracted positions, wherein said elongated cavity in said screw shank includes a circular internally threaded portion extending inwardly from said trailing engagement end for a short distance, an externally threaded set screw of short longitudinal dimension to threadedly engage with said internally threaded portion of said cavity and to seat therein, said reciprocating means including a compression spring seated at the opposite end of said elongated cavity, said spring being movable longitudinally between a compressed and a released position, said compression spring requiring mechanical advantage means to compress and having sufficient force when released to move longitudinally toward said released position to force said retaining member toward said trailing engagement end and said fingers outwardly of said aperture means to said extended position thereof for penetration into said work piece, said retaining member extending from abutment against the inner surface of said set screw at one end to abutment against said compression spring at the opposite end, said compression spring being moved to its compressed position by said retaining member when said set screw has been fully seated at the opposite end, said mechanical advantage means including said externally threaded set screw threadedly engaged with said internally threaded portion of said cavity at said trailing engagement end thereof.

* * * * *